United States Patent
Lee et al.

(10) Patent No.: US 7,814,215 B2
(45) Date of Patent: Oct. 12, 2010

(54) SYSTEM AND METHOD FOR CONTROLLING THE DEVICES CONNECTED TO CONTROL GATEWAY

(75) Inventors: Kuen-Ming Lee, Ping-Tung Hsien (TW); Yu-Shiang Sheng, Taipei (TW)

(73) Assignee: Industrial Technology Research Institute, Hsinchu (TW)

(*) Notice: Subject to any disclaimer, the term of this patent is extended or adjusted under 35 U.S.C. 154(b) by 876 days.

(21) Appl. No.: 11/616,294

(22) Filed: Dec. 27, 2006

(65) Prior Publication Data

US 2008/0095179 A1    Apr. 24, 2008

(30) Foreign Application Priority Data

Oct. 20, 2006    (TW) .............................. 95138754 A

(51) Int. Cl.
G06F 15/16    (2006.01)
(52) U.S. Cl. .................... 709/228; 709/208; 709/227
(58) Field of Classification Search ................ 709/208, 709/220, 227, 228
See application file for complete search history.

(56) References Cited

U.S. PATENT DOCUMENTS

| | | | |
|---|---|---|---|
| 2001/0034754 A1 | 10/2001 | Elwahab et al. | 709/201 |
| 2004/0267950 A1 | 12/2004 | Praefcke et al. | 709/231 |
| 2005/0144262 A1* | 6/2005 | Kang et al. | 709/220 |
| 2006/0159110 A1* | 7/2006 | Choi et al. | 370/401 |

OTHER PUBLICATIONS

Ditze, M.; Kamper, G.; Jahnich, I.; Bernhardi-Grisson, R., "Service-based access to distributed embedded devices through the open service gateway," IEEE Industrial Informatices, pp. 493-498, Jun. 2004.
Dobrev, P.; Famolari, D.; Kurzke, C.; Miller, B. A., "Device and service discovery in home networks with OSGi," IEEE Communications Magazine, pp. 86-92, Aug. 2002.

* cited by examiner

*Primary Examiner*—Larry Donaghue
*Assistant Examiner*—Brian J Gillis

(57) ABSTRACT

A system for controlling the devices connected to a control gateway includes one or more devices, a control gateway, a server and an open platform. The control gateway is electrically coupled to the devices. The server provides a plurality of control gateway base drivers. The open platform is electrically connected to the control gateway. According to the device's description and type information provided by the control gateway, the system automatically downloads a corresponding control gateway base driver from the server, and converts a first device service type into a second device service type automatically by the control gateway base driver. Thereby, other internal bundles on the open platform or external control devices with the second device service type can use the devices connected to the control gateway.

12 Claims, 9 Drawing Sheets

| Neuron ID | |
|---|---|
| NVL_NV0500067400 | |
| Device: LonWorks-OSGi Light | |
| DEVICE_CATEGORY | UPnP |
| FRIENDLY_NAME | LonWorks-OSGi Light |
| MANUFACTURER | ITRI-P100 |
| MANUFACTURER_URL | ttp://www.itri.org.tw |
| MODEL_DESCRIPTION | A BinaryLight device to test OSGi to UPnP service export |
| MODEL_NAME | ITRI |
| MODEL_NUMBER | 1 |
| MODEL_URL | http://IP.Address/Light/urc_xml/light-tps.xml |
| PRESENTATION_URL | http://IP.Address/Lonworks/Light |
| SERIAL_NUMBER | NVL_NV0500067400 |
| TYPE | urn:schemas-upnp-org:device:LonWorksLight:1 |
| UDN | uuid:ITRI-P100-LonWorksLight |
| UPC | 500067400 |
| Services | urn:schemas-upnp-org:serviceId:SwitchPower:1 |
| Service: SwitchPower | |
| SERVICE_ID | urn:schemas-upnp-org:serviceId:SwitchPower:1 |
| SERVICE_TYPE | urn:schemas-upnp-org:service:SwitchPower:1 |
| VERSION | 1 |
| Actions | SetBrightnessValue,GetBrightnessValue |
| Action: SetBrightnessValue | |
| ActionName | SetBrightnessValue |
| OUT_ARG_NAMES | n/a |
| IN_ARG_NAMES | BrightnessValue |
| ActionType | SET |
| Action: GetBrightnessValue | |
| ActionName | GetBrightnessValue |
| OUT_ARG_NAMES | BrightnessValue |
| IN_ARG_NAMES | n/a |
| ActionType | GET |

FIG. 5

| Binding: SetBrightnessValue Link | |
|---|---|
| Action name | SetBrightnessValue |
| Invoke Method | SET_VALUE |
| arg1 | SetBrightnessValue |
| arg2 | {"0.0 0","25.0 1","35.0 1","65.0 1","100.0 1"} |
| Binding: GetBrightnessValue Link | |
| Action name | GetBrightnessValue |
| Invoke Method | GET_VALUE |
| arg1 | GetBrightnessValue |

FIG . 5 (CONTINUED)

SYSTEM AND METHOD FOR CONTROLLING THE DEVICES CONNECTED TO CONTROL GATEWAY

FIELD OF THE INVENTION

The present invention generally relates to a system and method for controlling the devices connected to a control gateway, applicable to an open platform and a communication system between the devices connected to the control gateway.

BACKGROUND OF THE INVENTION

As the digital home and internet grow rapidly, the home network communication protocols, integration platforms, and middlewares are developed. As there exists no consensus on the digital home architecture and framework, there is neither a consensus on the standard protocol for the digital home. Therefore, the integration of different network communication protocols and networks becomes the most important issue in the digital home development. The open service platform proposed by the Open Services Gateway Initiative (OSGi) Alliance is one of the solutions.

In the most recent OSGi standard, only two connection types that can be converted to control the devices connected to an open service gateway are defined. The first is the Device Access standard, defining how to download a corresponding driver for a physical device connecting to an open service gateway (OSG). The second is through the network connection to convert to the universal plug and play (UPnP) standard. Through the conversion to the UPnP device service, the service can be provided to the internal bundles or the control devices of an external UPnP control point.

In general, in most digital home applications, the devices are not all connected to an open service gateway. Not all the devices have powerful network communication capability. The common connection for most devices is connected through a simple device with simple functions to a more powerful control gateway for external communication. The control gateway acts as a window to indirectly control the simple devices connected to the control gateway. For example, the home security layout is through a plurality of simple sensors, connected to a more powerful control host for overall control.

Another example is the LonWorks network layout for a smart home, including several LonWorks standard devices, connected to a LonWorks server. Through the LonWorks server, the goal of indirect control of LonWorks standard devices is achieved. In this architecture, it is usually impossible to directly communicate with the devices connected to the control gateway, and the communication must be accomplished through the control gateway. The present OSGi standard does not specify the connection method for controlling the connected devices through the control gateway.

The current OSGi standard defines only two solutions for network communication protocols, namely, UPnP and Jini, including how to convert the UPnP or Jini protocols to the OSGi standard, or how to convert the OSGi standard to the UPnP and Jini protocols. However, there is no mention of how to integrate or control the devices and the device services connected to the control gateway.

The aforementioned many architectures for devices connected to the control gateway can only treat the control gateway and the connected devices as a virtual device bundle if using OSGi defined Device Access standard, and then download the driver based on the virtual device bundle. The driver for the virtual device bundle is the collection of all the individual drivers for the control gateway and the connected devices. With this type of implementation, once a device is removed from the control gateway or a new device is added to the control gateway, the bundle driver is no longer applicable, and the new bundle driver needs to be downloaded.

This type of implementation is neither practical nor effectively since an entire bundle driver needs to be downloaded with only one device removed or added. The process is tedious, time-consuming and ineffective.

The UPnP Device Service defined in the present OSGi standard only provides an interface for converting the non-UPnP devices to UPnP device services so that internal bundles or external UPnP control points can use or control the devices. In addition, the OSGi also provides an UPnP base driver mechanism to the UPnP devices to automatically register the UPnP device services to the service registry of the open service gateway.

Because the open service platform cannot communicate directly with the devices connected to the control gateway, the above connection architecture cannot provide the devices connected to the gateway with the function of conversion to different device service and corresponding device service downloading.

Many current research papers focus on how to integrate non-OSGi network communication protocols or middlewares to the open service platform. For example, Ditze, M. et. al, presented a paper "Service-Based Access to Distributed Embedded device through the Open Service Gateway,", IEEE Industrial Informatics, pp. 493-498, June 2004. The prior art disclosed how to package the home audio-video interoperability (HAVi) and the devices on the control area network (CAN) as a control service through OSGi Device Access standard and JAVA native interface (JNI), and register to the service registry of the open service home gateway to achieve the goals of integration and control.

Another paper, presented by Dobrev, P., et. al., "Device and Service Discovery in Home Network with OSGi,", IEEE Communication Magazine, pp. 86-92, August 2002, disclosed the conversion standards between Jini and OSGi, and between UPnP and OSGi. This technique can only convert the Jini and UPnP device services, and the devices must have the capability of device discovery and the capability to be controlled.

The above two papers does not propose a solution for integrating the devices connected to the control gateway into the open service platform. Other patent documents mostly use the generation of a corresponding control mechanism on the open service platform to achieve the control of the devices being controlled by the standard middlewares or network protocols.

U.S. Patent Publication No. 2004/0267950 disclosed a method and an apparatus for using a device control module to control HAVi standard devices. This technique generates the device control module on the open service platform to match the device control module in the HAVi standard structure so as to control the HAVi standard devices.

U.S. Patent Publication 2001/034,754 disclosed a markup-language-type syntax to control the different network communication protocols used in home. Similarly, this document does not propose a solution to integrate the devices connected to the control gateway into the open service platform.

Taiwan Patent Application No. 94145773 disclosed a method for processing the conversion of the devices connected to the control gateway, and how to integrate into the open service platform to achieve the goals of integration and control. This system architecture must place the control gateway base driver on the open platform during the construction phase.

However, in actual applications, there may be many types of control gateways; therefore, it is impossible to build all the control gateway base drivers in the system when the open service gateways are manufactured. Furthermore, the control gateways must obtain their device service from the remote server or component download center through the network. The process is time-consuming and prone to connection interruption.

SUMMARY OF THE INVENTION

Examples of the present invention may provide a system and method for controlling the devices connected to a control gateway on an open platform. The system uses the device information and the device type information to automatically download the control gateway base driver, and uses a mechanism of automatic generation and conversion of device services by the control gateway base driver to provide the conversion of the devices connected to the control gateway to other device service forms and automatically generate and register to the open platform.

The system may include one or more devices, a control gateway, a server and an open platform. Each of the one or more devices has a piece of device information, and operates in a device service form. The control gateway is electrically coupled to the one or more devices, and has a piece of device type information. The server may provide a plurality of control gateway base drivers. The open platform is electrically coupled to the control gateway, and automatically downloads a corresponding control gateway base driver from the server according to the device type information. The open platform may also have a mechanism with the capability of automatic conversion and generation of another device service form that corresponds to the device according to the device information and can communicate with the control gateway for controlling the one or more devices.

The open platform may include a control gateway wire administration module, a service proxy, and an instruction management module.

The control gateway wire administration module may detect the existence of the control gateway, communicate with the control gateway, and download the corresponding control gateway base driver. The service proxy may convert the device service form of the original instruction for controlling the device. The instruction management module may convert the converted device service form into the instruction or information understandable to the control gateway, and transmit to the control gateway following the control gateway's communication protocol in order to control the device.

Because the control gateway base driver cannot communicate directly with the devices connected to the control gateway, it is necessary to collect all the device information through the control gateway. Therefore, the control gateway base driver must have the capability of device discovery to find the corresponding control gateway. The control gateway base driver can inquire the control gateway of the number of the devices connected to the control gateway, the device identification of each device, and device service description, and related information. Then, the control gateway base driver may generate the corresponding second form of device service on the open platform, register to the service registry, and generate corresponding device service objects.

At this point, the internal bundles on the open platform or the external control devices using other forms of device service can use or control these devices connected to the control gateway. This may provide convenience to the users of actual digital home applications, and concretize the digital life concept.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

FIG. 5 shows an example of the information required for converting LonWorks light device to UPnP device service.

DETAILED DESCRIPTION OF THE PREFERRED EMBODIMENTS

Figure 1:
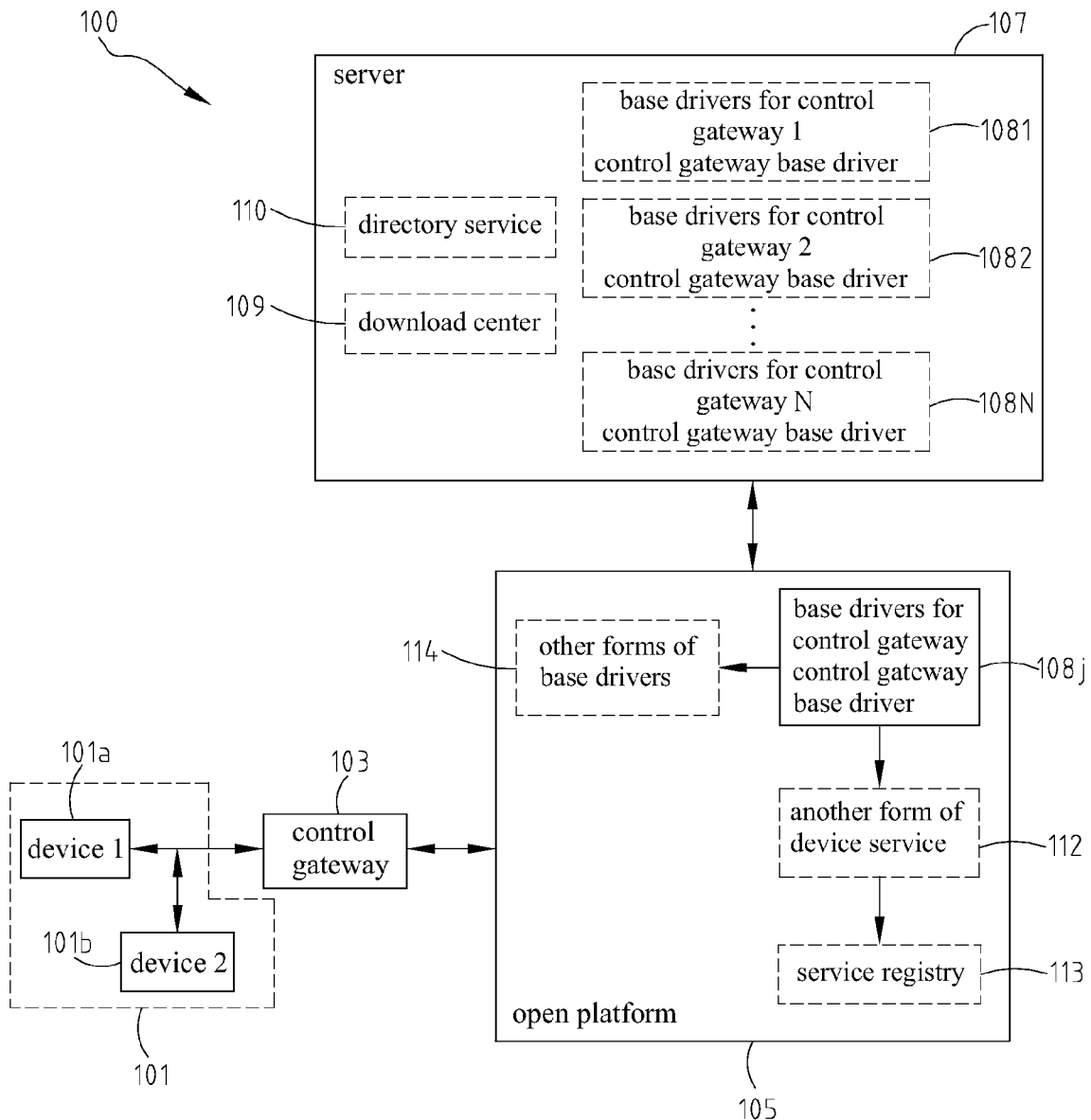
FIG. 1 shows a schematic view of the first embodiment of the present invention.

FIG. 1 shows a schematic view of the first embodiment of a system 100 for controlling the devices connected to a control gateway according to the present invention. As shown in FIG. 1, system 100 includes one or more devices 101 (such as 101a, 101b), a control gateway 103, an open platform 105, and a server 107.

Each of the one or more devices has a piece of device information, and operates in a device service form. Control gateway 103 is electrically coupled to devices 101a, 101b, and has a piece of device type information. Server 107 provides a plurality of control gateway base drivers 1081-108N to control gateways 1-N. The open platform 105 is electrically coupled to control gateway 103, and automatically downloads corresponding control gateway base driver 108j form server 107 according to the device type information. The open platform 105 also has a mechanism with the capability of automatic conversion and generation of another device service form that corresponds to devices 101a, 101b and can communicate with control gateway 103 for controlling devices 101a, 101b.

The device information may include the unit identification of the device, device description and a device service description. The device service description information is distinguished by groups, for example, according to the device functionality, or required parameters, so that the device service description information for the same device is unique.

Control gateway base drivers 1081-108N can be provided by the manufacturer according to the device type information. Server 107, in addition to providing control gateway base drivers 1081-108N, usually has a download center 109 and a directory service 110, as shown in FIG. 1.

The open platform 105 is for analyzing the device type information of control gateway 103, using the device type information to inquire directory service 110 of remote server 107, downloading control gateway base driver 108j corresponding to control gateway 103 from download center 109 to the open platform 105, and activating control gateway base driver 108j.

When control gateway base driver 108j is downloaded to the open platform 105 and receives the device information from control gateway 103, control gateway base driver 108j then searches for other device services of base drivers 114 of other forms existent on the open platform 105 to automatically generate corresponding device service 112 in the other device service form and register to service registry 113 on the open platform 105. At this point, the internal bundles on the open platform 105 or other external control devices using other forms of device service can use or control the device service, and transmit the converted instruction to control gateway 103. Then, control gateway 103 controls the connected one or more devices according to the converted instructions.

Based on this, system 100 of the present invention solves the problem that the open platform 105 cannot connect and directly communicate with devices 101 connected to control gateway 103.

Figure 2:
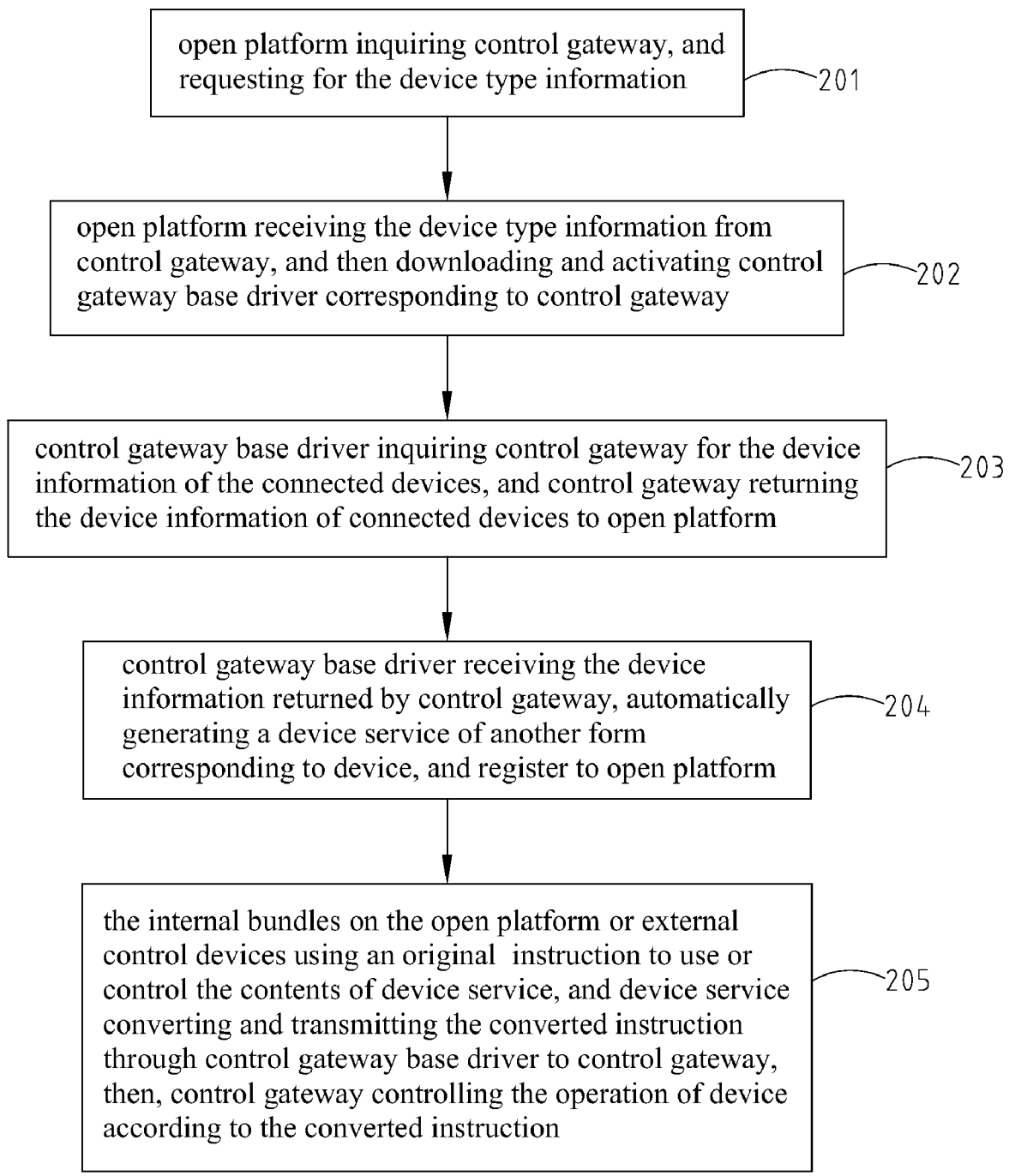
FIG. 2 shows a flowchart describing when the internal bundles on the open platform or other external control devices using the other form of device service use or control devices connected to a control gateway according to the present invention.

When control gateway 103 of system 100 of the present invention connects to the open platform 105, the internal bundles on the open platform 105 or other external control devices using other form of device service can use or control devices 101 connected to control gateway 103, shown as steps 201-205 of FIG. 2.

Step 201 is for the open platform 105 to inquire control gateway 103, and request for the device type information.

Step 202 is for the open platform 105 to receive the device type information from control gateway 103, and then download and activate control gateway base driver 108j corresponding to control gateway 103.

The open platform 105 analyzes the information returned from control gateway 103, and extracts the corresponding device type information. The device type information is used in the inquiry to directory service 110 of server 107. Server 107 responds to the inquiry from the open platform 105. If inquired control gateway base driver 108j exists and can be downloaded, directory service 110 of server 107 returns the downloadable component or download location, and automatically downloads and activates control gateway base driver 108j from download center 109 to the open platform 105.

If inquired control gateway base driver 108j does not exist, directory service 110 responds to the open platform 105 that the inquiry cannot be found.

Step 203 is for control gateway base driver 108j to inquire control gateway 103 for the device information of the connected devices 101, and for control gateway 103 to return the device information of connected devices 101 to the open platform 105.

Because control gateway base driver 108j cannot communicate directly with devices 101 connected to control gateway 103, it is necessary to collect the device information through control gateway 103. Control gateway base driver 108j must have the capability of device discovery to find corresponding control gateway 103.

Control gateway 103, after receiving the inquiry from control gateway base driver 108j, starts to collect the device information from the connected devices 101, including device identification, device description, and device service description, and related information. The collected device information is returned to control gateway base driver 108j.

Step 204 is for control gateway base driver 108j to receive the device information returned by control gateway 103, automatically generate a device service 112 of another form corresponding to device 101a or 101b, and register to the open platform 105.

In step 204, if the device service corresponding to the device exists on the open platform 105, there is no need to generate such a device service.

Control gateway base driver 108j analyzes the received device information returned, extracts device identification, device description, and device service description, uses the extracted information to search for the device services of other forms existent on the open platform 105, automatically generates a device service 112 of another form corresponding to the device 101a or 101b, registers device service 112 to service registry 113, and generates the corresponding device service object.

Step 205 is for the internal bundles on the open platform 105 or external control devices to use an original instruction to use or control the contents of device service 112, and for device service 112 to convert and transmit the converted instruction through control gateway base driver 108j to control gateway 103. The converted instruction can communicate with control gateway 103. Then, control gateway 103 controls the operation of devices 101 according to the converted instruction.

Figure 3:
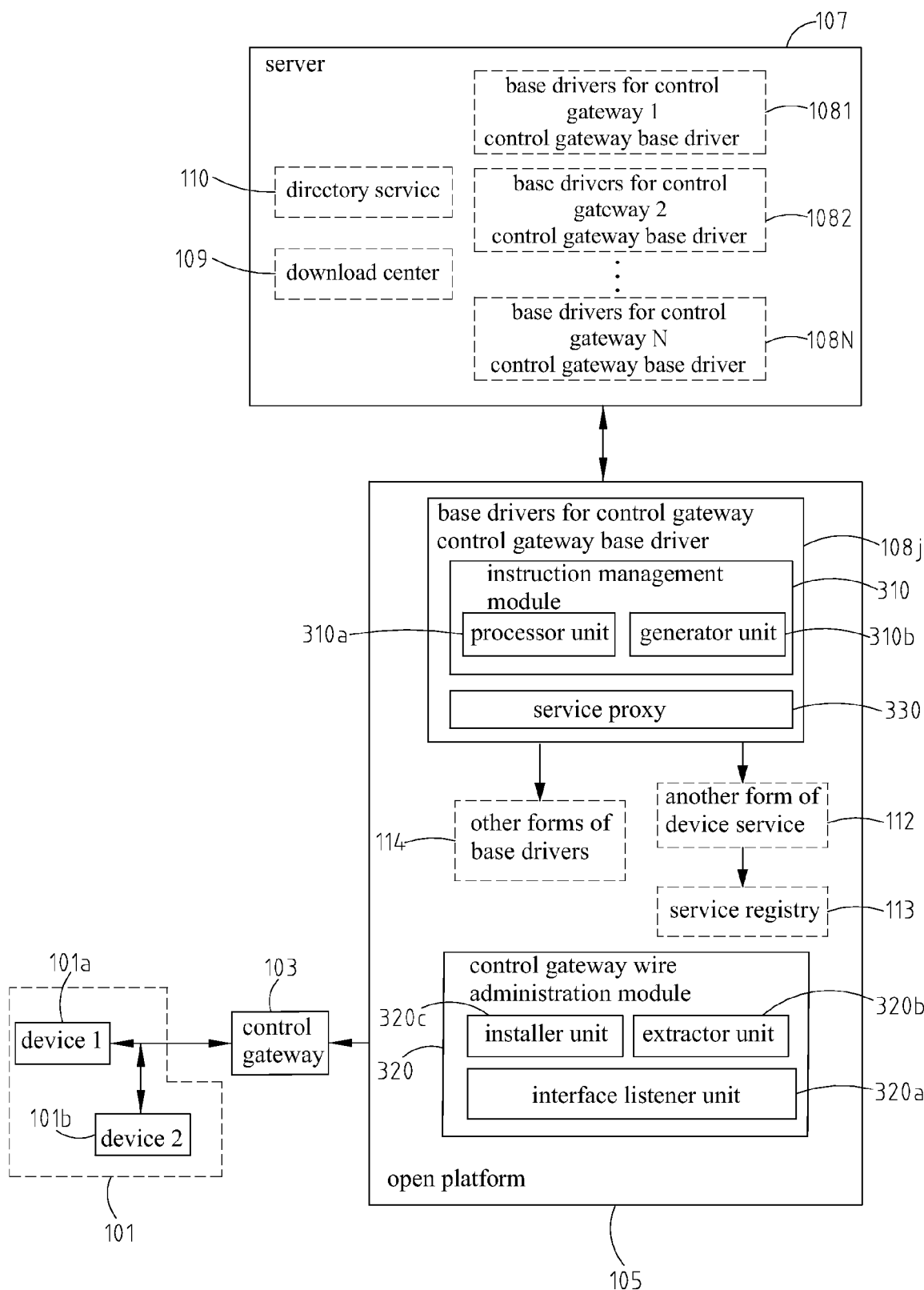
FIG. 3 shows a schematic view of the open platform shown in FIG. 1.

FIG. 3 shows a schematic view of the open platform. As shown in FIG. 3, the open platform 105 includes a control gateway wire administration module 320, a service proxy 330, and an instruction management module 310.

Control gateway wire administration module 320 downloads and activates control gateway base driver 108j from server 107. Control gateway wire administration module 320 further includes an interface listener unit 320a, an extractor unit 320b and an installer unit 320c, as shown in FIG. 3.

Interface listener unit 320a is for listening to all the interfaces on the open platform 105 to detect whether a control gateway 103 is connected to the open platform 105. Extractor unit 320b is for communicating with control gateway 103, and extracts the device type information of control gateway 103. Installer unit 320c is responsible for requesting, according to the device type information provided by extractor unit 320b, to server 107 for downloading and is also responsible for downloading and activating corresponding control gateway base driver 108j to the open platform 105.

As shown in FIG. 3, control gateway base driver 108j is mainly realized by instruction management module 310 and service proxy 330. When the internal bundles on the open platform 105 or the external control devices of other device service use an original instruction to control device service 112, control gateway base driver 108j converts the original instruction to device service 112 of the other device service form, and then converts to the form that can communicate with control gateway 103. Therefore, the internal bundles on the open platform 105 or the external control devices of other device service form can control devices 101 connected to control gateway 103.

Instruction management module 310 generates device service 112 of other form corresponding to device 101a or 101b on the open platform 105, registers the device service to the open platform 105, converts to an instruction that can communicate with control gateway 103, and uses a communication protocol to transmit to control gateway 103 for controlling connected devices 101. Instruction management unit 310 includes a processor unit 310a, and a generator unit 310b for performing the tasks.

Processor unit 310a receives and converts the signals transmitted by control gateway 103 to indirectly achieve device discovery. Processor unit 310a also receives instruction from service proxy 330, converts into an instruction acceptable to control gateway 103, and transmits the instruction to control gateway 103 in a communication protocol suitable for control gateway 103 to control connected devices 101.

Generator unit 310b searches for other forms of device service existent on the open platform 105. Then, generator unit 310b, using the other forms of device service, generates service proxy 330 of other device service form. Then, generator unit 310b registers proxy service 330 to service registry 113 of the open platform 105.

Service proxy 330 includes a device-service-form-dependent device service content, and is responsible for the conversion between different device service forms. Through each service proxy, a corresponding device service 112 can be obtained so that devices 101 connected to control gateway 103 can be controlled.

Figure 4:
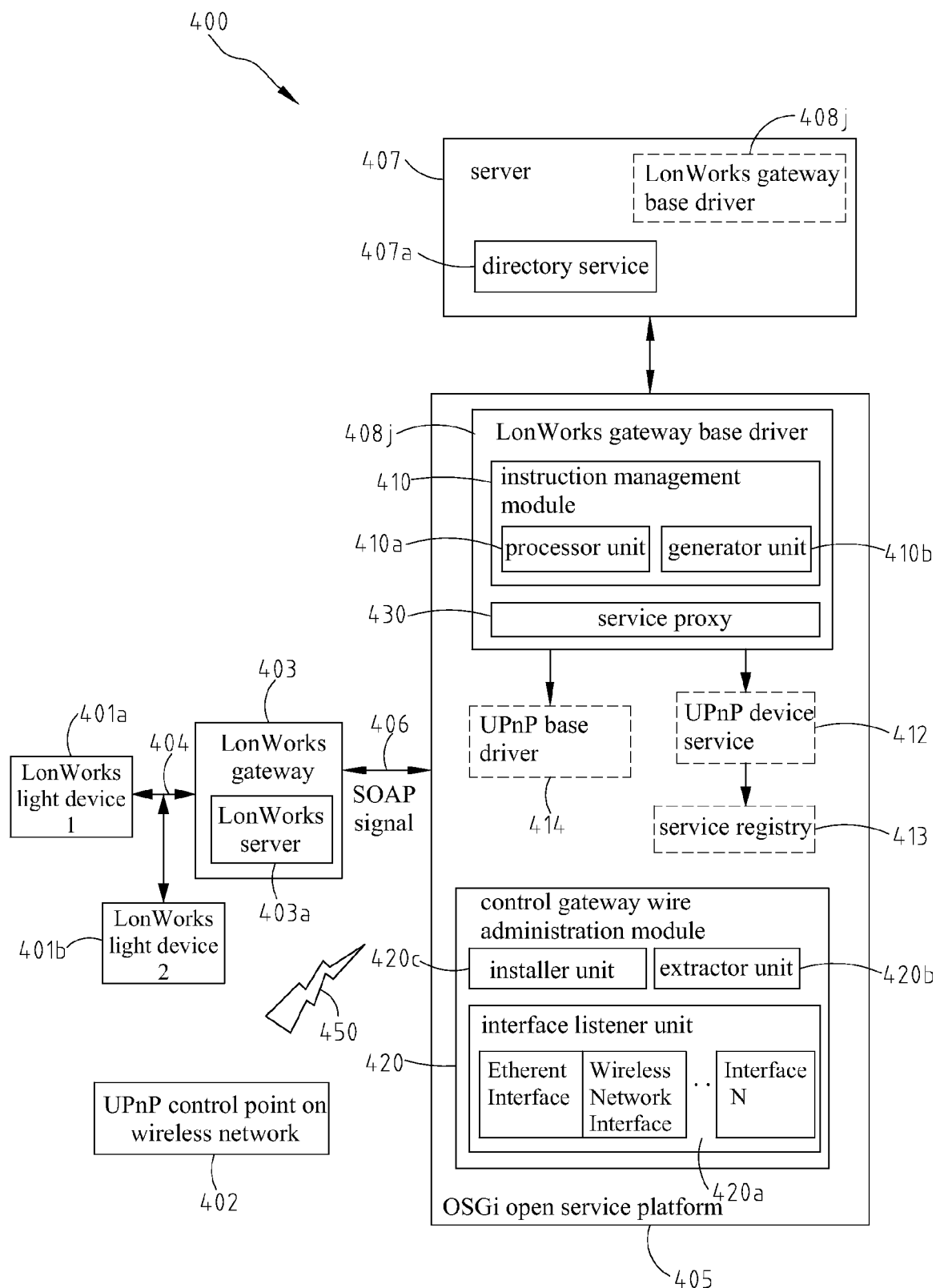
FIG. 4 shows a working example of the present invention.

FIG. 4 shows a working example of the present invention, including the use of a control device of an UPnP control point 402 in an external wireless network 450 to control standard LonWorks devices, for example, LonWorks light devices 401a-401b connected to LonWorks gateway 403. LonWorks standard devices use power line 404 to connect LonWorks gateway 403.

As shown in FIG. 4, system 400 of the example includes a LonWorks gateway 403, a plurality of LonWorks light devices 401a-401b, connected to LonWorks gateway 403 through power line 404, an OSGi open service platform 405, communicated with LonWorks gateway 403 through simple object access protocol (SOAP) signal 406, and a control device of an UPnP control point 402 in an external wireless network 450, connected to the OSGi open service platform 405 through wireless network 450.

The OSGi open service platform 405 includes a control gateway wire administration module 420, and an UPnP base driver 414. Control gateway wire administration module 420 is for communicating with LonWorks gateway 403, and downloading base driver 408j corresponding to LonWorks gateway from server 407 for the OSGi open service platform 405.

Interface listener unit 420a of control gateway wire administration module 420 detects LonWorks gateway 403 is connected to the open service platform 405 through a network interface. Extractor unit 420b is for communicating with LonWorks gateway 403. Because at present LonWorks server 403a of LonWorks gateway 403 uses SOAP signal 406 for external communication, extractor unit 420b receives, transmits and analyzes SOAP signal 406, and extracts the device type information of LonWorks gateway 403.

Finally, installer unit 420c is responsible for requesting, according to the extracted device type information of LonWorks gateway 403, to remote server 407 for downloading and is also responsible for downloading and activating corresponding LonWorks gateway base driver 408j to the OSGi open service platform 405.

LonWorks gateway base driver 408j can convert SOAP signal 406 of LonWorks server 403a to UPnP device service 412 standard.

LonWorks gateway base driver 408j is mainly realized by instruction management module 410 and service proxy 430. Instruction management module 410 is mainly for communicating with LonWorks server 403a, receiving and transmitting SOAP control signal and information, and extracting the useful information. In addition, instruction management module 410 is for converting the instruction from UPnP control point 402 of wireless network 450 into the format of SOAP signal 406 for transmitting to LonWorks server 403a to achieve the control of LonWorks light devices 401a-401b.

In this embodiment, processor unit 410a of instruction management module 410 provides two main functions. The first is to receive and convert SOAP signal 406, and transmit it to LonWorks server 403a. The second is to receive instructions from service proxy 430, convert the received instructions to the format of SOAP signal 406, and transmit it to LonWorks server 403a to control LonWorks lights 401a, 401b.

For example, processing unit 410a performs the analysis and packaging of SOAP signal. First, processing unit 410a collects SOAP signals 406 issued by LonWorks server 403a, analyzes and extracts useful information, and transmits the information to service proxy 430 and generator unit 410b. In addition, processor unit 410a is also responsible for packaging the instruction issued by UPnP control point 402 of external wireless network 450 into the format of SOAP signal 406. Then, processor unit 410a transmits SOAP signal 406 to LonWorks server 403a to control LonWorks lights 401a, 401b.

Generator unit 410b generates service proxy 430 for converting between LonWorks standard device service and UPnP device service, and registers proxy service 430 to service registry 413 of the open service platform 405. Through service proxy 430, a corresponding UPnP device service 412 can be obtained for LonWorks lights 401a, 401b to achieve the control of LonWorks lights.

The LonWorks gateway manufacturer must provide a unit identification for the device type to server 407 for finding and downloading corresponding control gateway base driver 408j. With the use of service directory 407a of server 407, system 400 is more flexible and easy for management.

SOAP signal 406 issued by LonWorks server 403a includes only information on the control and state variables of network variable input (NVI) and network variable output (NVO). On the other hand, the content of standard form of UPnP device service usually includes UPnP service description and UPnP device description. Therefore, the actual SOAP signal 406 issued by LonWorks server 403a is insufficient for system 400 to convert into corresponding UPnP device service 412 standard form. As a result, when LonWorks server 403a uses SOAP signal 406 to communicate with the OSGi open service platform 405, LonWorks server 403a must provide LonWorks device type information, and LonWorks device type information to be embedded in SOAP signal 406 for control gateway wire administration module 420 to analyze and request the downloading of LonWorks gateway base driver 408j from server 407.

The Neuron chip of each LonWorks standard device includes a neuron id. The neuron id is a globally unique number representing the serial information of the LonWorks device. Using the uniqueness of the id, the neuron id is embedded in the nvl name, and the UPnP service description, UPnP device description, and link information are also embedded when the LonMaker tool is used to construct the LonWorks network in the beginning FIG. 5 shows an example of the information that is required for converting LonWorks light devices 401a-401b to UPnP service device 412.

As shown in FIG. 5, SOAP signal 406 issued by LonWorks server 403a includes the LonWorks light device information of FIG. 5, including neuron id, device description, and device service description. The information is used for generating a service proxy of different device service form.

The manufacturers must follow the standard interface of UPnP Device Service defined in Chapter 111 of OSGi Service Platform Release 4 to provide the UPnP device service information, i.e., UPnP service description, UPnP device description, and link information, and so on.

The standard form of UPnP device service 412 of system 400 is the UPnP Device Service standard defined by the OSGi Alliance. It is a standard interface to convert a non-UPnP device into a standard UPnP device of the open service platform. In other words, the present invention does not need to define a new standard, which increases the acceptance of the present invention. The explanation of the standard interface of UPnP device service 412 is omitted here.

Figure 6:
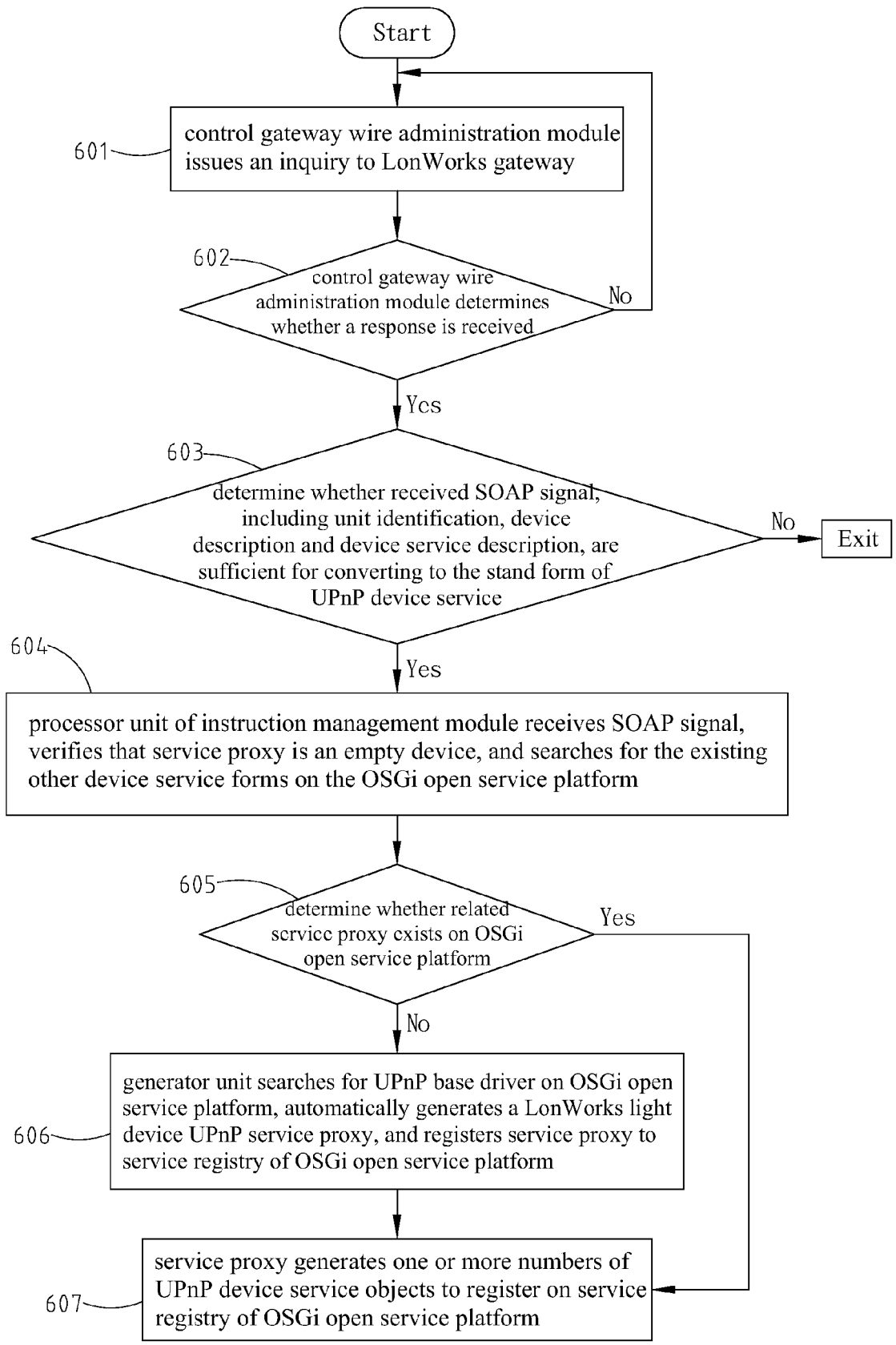
FIG. 6 shows a flowchart illustrating the operation of the conversion of the format of SOAP signal into the standard form of UPnP device service.

In the above working examples, the control device of UPnP control point 402 of wireless network 405 controls LonWorks lights 401a, 401b by converting SOAP signal 406 into the standard form of UPnP device service 412. FIG. 6 shows the flowchart of the operation of the conversion of SOAP signal 406 into the standard form of UPnP device service 412.

Initially, service proxy 430 of LonWorks gateway base driver 408j on the OSGi open service platform 405 is an empty device and does not provide the UPnP device service 412. When LonWorks gateway 403 connects to the OSGi open service platform 405, LonWorks gateway base driver 408j can communicate with LonWorks gateway 403 after obtaining the IP address of LonWorks gateway 403 and the Web Service Description Language (WSDL) information.

Then, control gateway wire administration module 420 issues an inquiry to LonWorks gateway 403, as shown in step 601. Step 602 is for control gateway wire administration module 420 to determine whether a response is received. If not, step 601 is repeated; otherwise, step 603 is to determine whether received SOAP signal 406, including neuron id, device description and device service description are sufficient for converting to the standard form of UPnP device service 412. If not sufficient, the signal is considered as an exception, and exits.

If SOAP signal 406 provides sufficient information to convert to the standard form of UPnP device service 412, processor unit 410a of instruction management module 410 receives SOAP signal 406, verifies that service proxy 430 is an empty device, and searches for the existing other device service forms on the OSGi open service platform 405, as shown in step 604. Step 605 is to determine whether related service proxy exists on the OSGi open service platform 405.

If the related service proxy does not exist, generator unit 410b searches for UPnP base driver 414 on the OSGi open service platform 405, automatically generates a LonWorks light device UPnP service proxy 430, and registers service proxy 430 to service registry 413 of the OSGi open service platform 405, as shown in step 606.

When generator unit 410b generates the service proxy in step 606, generator unit 410b, in addition to the generation of the service proxy following the standard interface of the UPnP device service, must concern about the interface conformity between service proxy 430 and instruction management module 410 in LonWorks gateway base driver 408j to ensure the correct communication between the two. For example, a common Get nvl and Set nvl interface must be defined. That is, an interlink information must be provided.

After generator unit 410b generates service proxy 430 for the conversion of LonWorks standard device service and UPnP device service, LonWorks gateway base driver 408j includes the complete function, and service proxy 430 generates one or more numbers of UPnP device service 412 objects to register on service registry 413 of the OSGi open service platform 405, as shown in step 607. Hence, LonWorks lights 401a, 401b can be converted indirectly into UPnP standard devices. That is, UPnP control point 402 on an external wireless network 450 can discover LonWorks lights 401a, 401b through the UPnP standard device discovery mechanism, and controls LonWorks lights 401a-401b.

In step 605, if service proxy 430 exists on the OSGi open service platform 405, step 607 can be executed directly. Hence, LonWorks gateway base driver 408j includes the complete function for converting between SOAP signal 406 and UPnP standard form.

Figure 7A:
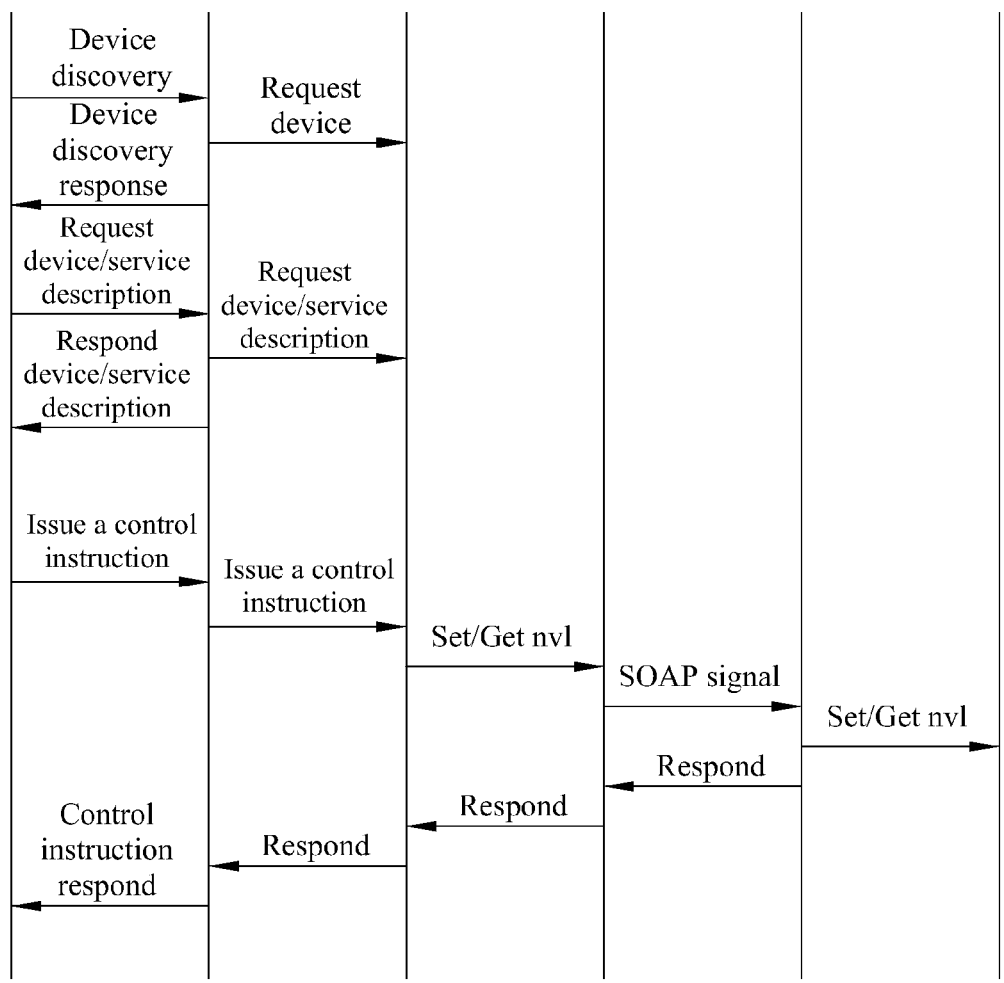
FIG. 7A shows a flowchart illustrating the operation of an UPnP control point on an external wireless network controlling LonWorks light devices of the working example of FIG. 4.
Figure 7B:
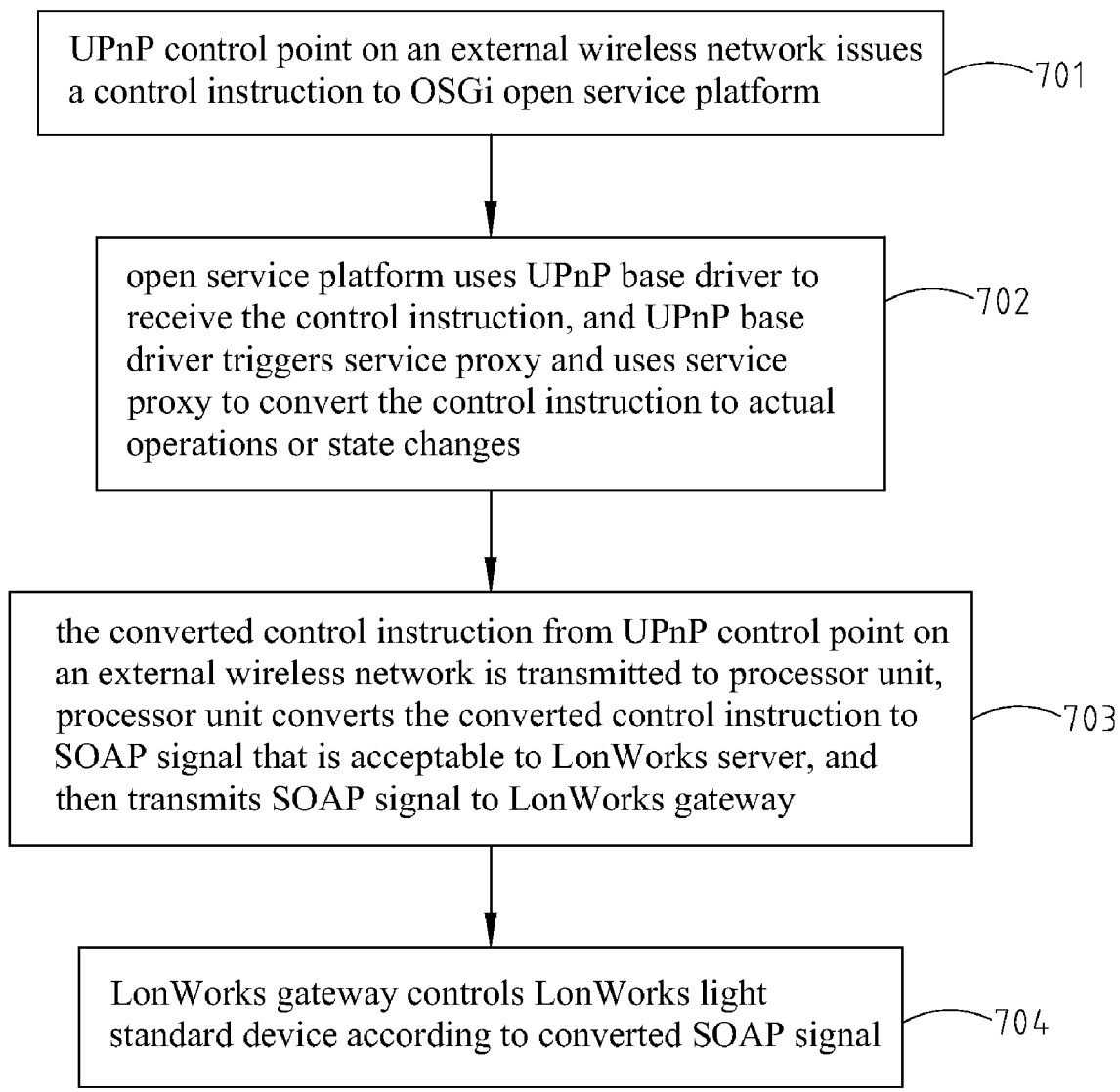
FIG. 7B describes the flowchart of FIG. 7A.

FIG. 7A shows a flowchart illustrating the operation of an UPnP control point on an external wireless network 450 controlling LonWorks light devices 401a-401b of the example of FIG. 4. FIG. 7B describes the flowchart of FIG. 7A.

Referring to FIGS. 7A and 7B, step 701 is for UPnP control point 402 on an external wireless network 450 to issue a control instruction to the OSGi open service platform 405. The open service platform 405 uses UPnP base driver 414 to receive the control instruction, and UPnP base driver 414 triggers service proxy 430 and uses service proxy 430 to convert the control instruction to actual operations or state changes, as shown in step 702.

Then, the converted control instruction from UPnP control point 402 on an external wireless network 450 is transmitted to processor unit 410a. Processor unit 410a converts the converted control instruction to SOAP signal 406 that is acceptable to LonWorks server 403a, and then transmits SOAP signal 406 to LonWorks gateway 403, as shown in step 703. Finally, LonWorks gateway 403 controls LonWorks light 401a-401b standard device according to converted SOAP signal 406, as shown in step 704.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A system for controlling devices connected to a control gateway, said system comprising:

one or more devices, each of said one or more devices having a piece of device information and operating in a first device service form;

a control gateway, electrically coupled to said one or more devices, and having a piece of device type information;

a server, providing a plurality of control gateway base drivers; and an open platform, electrically coupled to said control gateway, automatically downloading a control gateway base driver from said server according to said device type information, also having a mechanism with capability of automatic conversion and generation of a second device service form from said first device service form according to said device information;

wherein said control gateway uses said first device service form to communicate with and control said one or more devices;

wherein said open platform further includes:

a control gateway wire administration module, for detecting the presence of said control gateway, downloading said control gateway base driver according to said device type information, and activating said control gateway base driver;

a service proxy, having a form-dependent device service content, responsible for converting said first device service form to said second device service form; and an instruction management module, for generating device service content corresponding to said one or more devices on said open platform, registering said device service content on said open platform, and converting said device service content to an instruction acceptable to said control gateway, and using a communication protocol to transmit said instruction to said control gateway for controlling said devices.

2. The system as claimed in claim 1, wherein said device information further includes a unit identification, a device description, and a device service description, and said control gateway provides said device information to said open platform.

3. The system as claimed in claim 2, wherein said instruction management module further includes:

a processor unit, for receiving and converting signal formats transmitted by said control gateway to indirectly achieve device discovery, also receiving a device service of said second device service form from said service proxy, converting said device service into said instruction acceptable to said control gateway, and transmitting said instruction to said control gateway in a communication protocol suitable for said control gateway to control said one or more devices; and a generator unit, for generating device services corresponding to said one or more devices on said open platform according to said device description and said device service description provided by said control gateway, and registering said device services to said open platform.

4. The system as claimed in claim 1, wherein said control gateway wire administration module further includes:

an interface listener unit, for listening to all interfaces on said open platform to detect whether said control gateway is connected to said open platform;

an extractor unit, for communicating with said control gateway, and extracting said device type information of said control gateway; and an installer unit, for downloading and activating said control gateway base driver to said open platform according to said device type information.

5. The system as claimed in claim 1, wherein said control gateway base driver according to said device type information is realized by said instruction management module and said service proxy.

6. A method for controlling devices connected to a control gateway, applicable to a communication system between an open platform and the device connected to a control gateway, said device operating in a first device service form, said method comprising the steps of:

said open platform inquiring said control gateway, and requesting for device type information of said control gateway;

said open platform receiving said device type information from said control gateway, and downloading and activating a control gateway base driver corresponding to said control gateway according to said device type information;

said control gateway base driver inquiring said control gateway for device information of said device, and said control gateway returning said device information of said device to said open platform; and said control gateway base driver receiving said device information returned by said control gateway, automatically generating a device service of a second device service form corresponding to said device, and registering said device service to said open platform;

wherein when a control device uses said device service of said second device service form on said open platform, said control device uses an original instruction to issue said device service, said control gateway base driver converts said instruction to a converted instruction acceptable to said control gateway, and said control gateway uses said converted instruction to control said device;

wherein said open platform provides a control gateway wire administration module for communicating with said control gateway, when said control gateway is connected to said open platform, said control gateway wire administration module detects the presence of said control gateway, listens and extracts said device type information of said control gateway, downloads said control gateway base driver, and activates said control gateway base driver.

7. The method as claimed in claim 6, wherein said device information further includes a unit identification of said device, a device description, and a device service description.

8. The method as claimed in claim 7, wherein said device service description is distinguished by a group so that said device service description of a same device is unique.

9. The method as claimed in claim 8, wherein said device service description is distinguished based on one of three ways including functions of said device, parameters required, and combination of the above two.

10. The method as claimed in claim 6, wherein said control device includes other bundles on said open platform or an external control devices.

11. The method as claimed in claim 6, wherein the operation of said control gateway base driver further includes the steps of:

having a device service content defined by said second device service form, and responsible for conversion between said first device service form and said second device service form;

generating said device service content corresponding to said device, and registering said device service content conforming to said second device service form to said open platform; and responsible for converting an original instruction using said second device service form into a converted instruction acceptable to said control gateway, and transmitting said converted instruction through a communication protocol to said control gateway for controlling said device.

12. The method as claimed in claim 6, wherein said open platform downloads said control gateway base driver from a server.

* * * * *